US006481882B1

(12) United States Patent
Pojar

(10) Patent No.: US 6,481,882 B1
(45) Date of Patent: Nov. 19, 2002

(54) LIGHT PIPE FIXTURE WITH INTERNAL EXTRACTOR

(75) Inventor: Stephen J. Pojar, Marine-on-the-St. Croix, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/564,608

(22) Filed: May 4, 2000

(51) Int. Cl.$^7$ ................................................. F21V 5/02
(52) U.S. Cl. ......................... 362/559; 362/31; 362/560; 359/598; 359/837
(58) Field of Search .................. 362/559, 560, 362/576, 551, 31; 359/831, 833, 834, 837, 595, 598; 385/133

(56) References Cited

U.S. PATENT DOCUMENTS

| | | |
|---|---|---|
| 3,689,346 A | 9/1972 | Rowland |
| 4,244,683 A | 1/1981 | Rowland |
| 4,260,220 A | 4/1981 | Whitehead |
| 4,344,110 A * | 8/1982 | Ruediger ................... 362/560 |
| 4,576,850 A | 3/1986 | Martens |
| 4,615,579 A * | 10/1986 | Whitehead .................. 385/133 |
| 4,787,708 A | 11/1988 | Whitehead |
| 4,805,984 A | 2/1989 | Cobb, Jr. |
| 4,850,665 A * | 7/1989 | Whitehead .................. 385/133 |
| 4,906,070 A | 3/1990 | Cobb, Jr. |
| 5,056,892 A | 10/1991 | Cobb, Jr. |
| 5,243,506 A * | 9/1993 | Whitehead ................... 362/307 |
| 5,339,382 A * | 8/1994 | Whtiehead ................... 385/146 |
| 5,661,839 A | 8/1997 | Whitehead |
| 5,715,347 A | 2/1998 | Whitehead |
| 5,832,164 A * | 11/1998 | Miekis ........................ 385/136 |
| 5,901,266 A | 5/1999 | Whitehead |
| 6,160,948 A * | 12/2000 | McGaffigan ................ 385/901 |

FOREIGN PATENT DOCUMENTS

| | | |
|---|---|---|
| DE | 42 04 380 C1 | 5/1993 |
| DE | 297 23 561 U1 | 11/1998 |
| EP | 0 235 447 A2 | 9/1987 |
| EP | 0 800 036 A1 | 10/1997 |

* cited by examiner

Primary Examiner—Sandra O'Shea
Assistant Examiner—Ismael Negron
(74) Attorney, Agent, or Firm—David B. Patchett

(57) ABSTRACT

An illumination device for transmitting and/or distributing light with an extractor that extends distally into the interior of the light guide. The illumination device includes a hollow light guide including a wall having an inner surface and a structured outer side. The structured outer side includes a plurality of prisms defining grooves that extend along a length of the light guide. An extractor extends substantially along the length of the light guide and projects distally from the inner surface towards an interior of the light guide. The extractor is operative to cause light to be released through the wall of the light guide. A method of attaching the extractor is also disclosed.

45 Claims, 5 Drawing Sheets

LIGHT PIPE FIXTURE WITH INTERNAL EXTRACTOR

FIELD OF THE INVENTION

The present invention relates generally to a light guide for transmitting and/or distributing light. More particularly, the present invention relates to an internal extractor for a light guide that transports light by total internal reflection.

BACKGROUND OF THE INVENTION

Light guides (i.e., light pipes, light conduits or light tubes) are commonly used to transmit light from a light source (e.g., a high intensity bulb) to a remote location with relatively low transmission losses. Light guides can also be used to effectively distribute decorative or functional light over relatively large areas.

Prism light guides and light guide luminaires are known in the patented prior art. The Whitehead U.S. Pat. No. 4,260,220, for example, discloses a hollow longitudinal light guide structure made of transparent dielectric material, such as acrylic plastic or optically clear glass, for transmitting or "piping" light from a central source to a remote location. The light guide includes substantially planar inner and outer surfaces that are in "octature." The light guide is formed of one or more longitudinal sections, each preferably having a constant cross-section along its length. The light guide can have a hollow rectangular or square cross-sectional structure made of four longitudinal wall sections bonded to form corners. The light guide can include an outer jacket or cover to protect the outer surface of the dielectric material from damage. The corners of the light guide are held in the protective jacket by corner strips and strip springs.

The Whitehead U.S. Pat. No. 4,615,579 discloses a luminaire for a prism light guide system including a light release mechanism for releasing light along the length of the light guide. The light release mechanism can be a non-planar surface, a rough outer surface, or round corners in an outer corrugated surface. The Whitehead U.S. Pat. No. 4,787,708 discloses a variety of additional techniques for continuously controlling the emission of light from a light guide such that, for example, the amount of light escaping per unit length along the light guide can be made constant to provide uniform illumination. To reflect any escaping light back into the luminaire so that it can be released through the desired surface, all of the outer surfaces through which it is not desired to have light escape can be covered by a highly reflective diffuse material such as a mirror, white paint, white plastic, white paper, or white fabric.

Light guides and light guide luminaires may be constructed with a variety of cross-sectional shapes as disclosed in U.S. Pat. Nos. 4,260,220 (Whitehead), 5,661,839 (Whitehead), 5,715,347 (Whitehead), and 4,805,984 (Cobb, Jr.). In addition, light guides can be constructed using a variety of materials such as transparent dielectric materials including acrylic plastic or optically clear glass as disclosed in U.S. Pat. No. 4,260,220 (Whitehead), or multi-layer optical films as disclosed in U.S. Pat. No. 5,661,839 (Whitehead).

The optical lighting film (hereinafter "OLF") is typically a relatively thin sheet of transparent material (e.g., acrylic or polycarbonate) having a linear array of prisms embossed or otherwise formed at one side of the sheet. OLF's suitable for use in manufacturing light guides are disclosed in U.S. Pat. Nos. 4,906,070 and 5,056,892.

Conventional light guide luminaire systems are typically constructed to a desired length and may be made in separate sections for handling and shipping ease. More recently, modular light guide luminaire systems have been developed utilizing a number of separate modules which are joined to form a chain as described in U.S. Pat. No. 5,901,266 (Whitehead). Each module is the same except for the extractor that must be sized to ensure the proper amount of light is emitted from each module depending on the location of the module within the chain. Since each module is constructed before it is assembled into a light distribution chain, a large inventory of modules, each having a specifically sized extractor, must be maintained to construct a light distribution system. Thus, current light guide luminaire systems must be designed for their intended end use application and once assembled, cannot be easily modified.

Various techniques have been used to extract light from a light guide for the purpose of illuminating an area. One technique involves altering the prisms (e.g., by rounding the prism corners, abrading the prisms, completely removing selected prisms, etc.) such that light is released through the altered regions. Another technique involves placing a light extractor on an inner surface of the light guide. Typically, the extractor is a strip or sheet of material (e.g., "SCOTCH-CAL EXTRACTOR FILM™") configured to reflect the light toward the light guide wall at an angle outside the angular range of total internal reflection. When the light is reflected in such a manner, the internal reflectance of the light guide is reduced, thereby allowing light to escape through the wall of the guide to provide decorative or is functional lighting.

Some light pipe fixtures are designed to deliver the majority of the luminous flux upwardly, to reflect off the ceiling and down into the workspace. Diffuse lighting is highly desirable in certain applications where glare is a consideration, such as office space with computer screens. By locating a back reflector at the bottom of the light pipe, most of the luminous flux will be directed upwardly, leaving the back reflector with a soft glow. Locating the extractor along the top surface of the light guide will interfere with upward scattering of the luminous flux, thereby defeating the attempt to create indirect lighting. Locating the extractor along the bottom of the light guide will create a shadow on the back reflector.

It would therefore be desirable to provide an extractor for indirect lighting applications that does not create shadows on the light guide luminaire. It would also be desirable to create a light guide luminaire that can be easily modified or customized to meet particular end use applications, thereby reducing the inventory of modules needed to construct different light guide luminaire systems, and eliminating the need to separately design each segment of the light guide luminaire system based on the end-use application.

SUMMARY OF THE INVENTION

The present invention relates generally to an illumination device for transmitting and/or distributing light with an extractor that extends distally into the interior of the light guide.

In one embodiment, the illumination device comprises a hollow light guide including a wall having an inner surface and a structured outer side. The structured outer side includes a plurality of prisms defining grooves that extend along a length of the light guide. An extractor extends substantially along the length of the light guide and projects distally from the inner surface towards an interior of the light guide. The extractor is operative to cause light to be released through the wall of the light guide.

In one embodiment, the extractor comprises at least one treated surface operative to cause light to be released through the wall of the light guide. The treated surface can be a diffusely reflective surface. Alternatively, the treated surface comprises material removed from, and/or added to, at least a portion of a surface of the extractor. In another embodiment, the treated surface is a film applied to at least a portion of the extractor. The film may have diffusely reflective properties on one surface and an adhesive on the other surface. In yet another embodiment, the treated surface may be a printed pattern on at least a portion of the extractor. The printed pattern may be formed using inks, dyes or paints.

The extractor may progressively increase the quantity of light released through the wall of the light guide. The extractor may be a translucent material. In another embodiment, the extractor comprises a transparent material with one or more treated surfaces. The extractor may have a non-uniform surface area, either alone or in combination with the various treated surfaces.

The extractor can be shaped to generally follow a portion of a contour of the inner surface. The extractor can be permanently or releasably attached to the light guide. In one embodiment, the light guide comprises a mounting surface to which the extractor is attached. In another embodiment, an extrusion extends along the length of the light guide. The extrusion comprises an interface to which the extractor is attached. The extractor may be releasably attached to the extrusion.

The principles of the present invention also include a method of forming an illumination device comprising providing a hollow light guide including a wall having an inner surface and a structured outer side. An extractor is attached substantially along the length of the light guide and projects distally from the inner surface towards an interior of the light guide.

The principles of the present invention also include a method of forming an illumination device with a plurality of hollow light guides. An extractor is attached substantially along the length of the light guides and projects distally from the inner surface towards an interior of the light guides. The plurality of light guides are preferably substantially identical, while the extractor is designed for a particular installation site. In one embodiment, the plurality of light guides are attached together before the extractor is attached. In another embodiment, the plurality of light guides are installed at an installation site before the extractor is attached.

BRIEF DESCRIPTION OF THE DRAWINGS

The accompanying drawings, which are incorporated in and constitute a part of this specification, illustrate several aspects of the invention and together with the description, serve to explain the principles of the invention. A brief description of the drawings is as follows.

DETAILED DESCRIPTION OF THE INVENTION

Reference will now be made in detail to exemplary aspects of the present invention that are illustrated in the accompanying drawings. Wherever possible, the same reference numbers will be used throughout the drawings to refer to the same or like parts.

Figure 1:
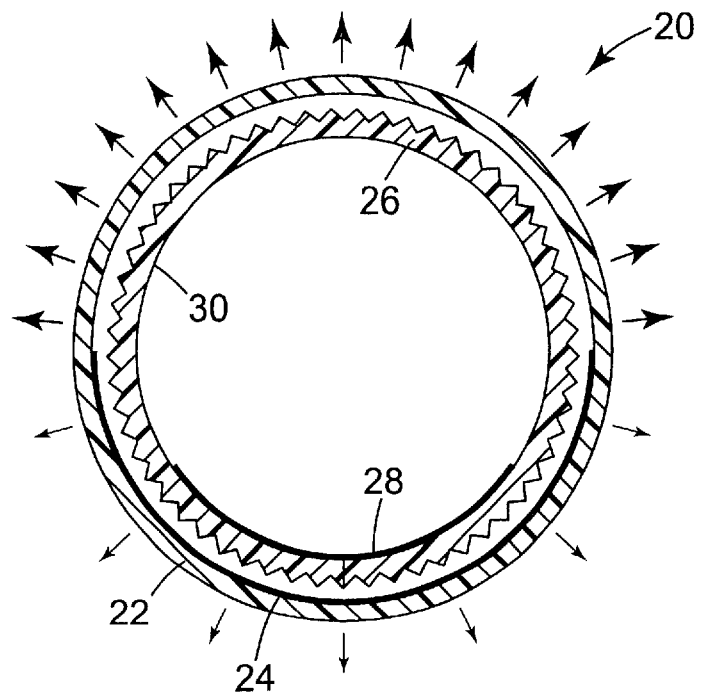
FIG. 1 is an end-sectional view of a light guide for indirect lighting in accordance with the principles of the present invention.

FIG. 1 illustrates a light guide 20 (also referred to as a "light guide luminaire") for indirect lighting applications. The light guide 20 has a circular cross-section and includes an outer shell 22, and a translucent or opaque (light-blocking) back reflector 24 fitted tightly against a portion of the inner surface of the shell 22, and optical lighting film 26 arranged adjacent the back reflector 24. Translucent refers to a material that transmits light so diffusely that objects cannot be seen distinctly.

The optical lighting film 26 is a continuous sheet of film and includes an extractor material 28 applied directly to the inner surface 30 of the film 26 prior to assembly. The extractor material 28 will create a shadow on the back reflector. The optical lighting film 26 is frictionally held in place due to the force created by bending the film and inserting it into the outer shell 22. Light entering the light guide 20 within an acceptable angular range is contained by total internal reflection as it travels along the length of the light guide. Another exemplary light guide is disclosed in U.S. Pat. No. 4,805,984.

Figure 2:
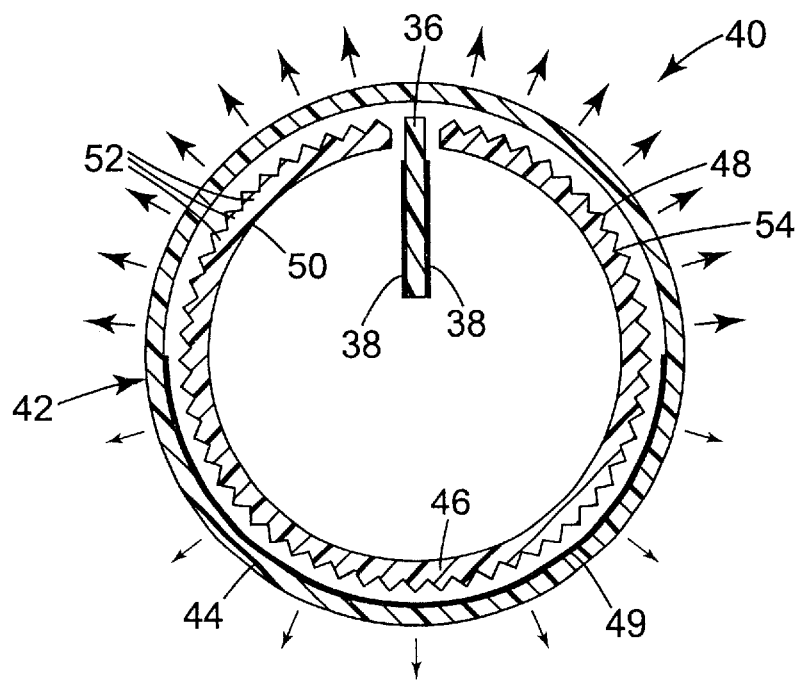
FIG. 2 is an end-sectional view of a light guide in accordance with the principles of the present invention.
Figure 3:
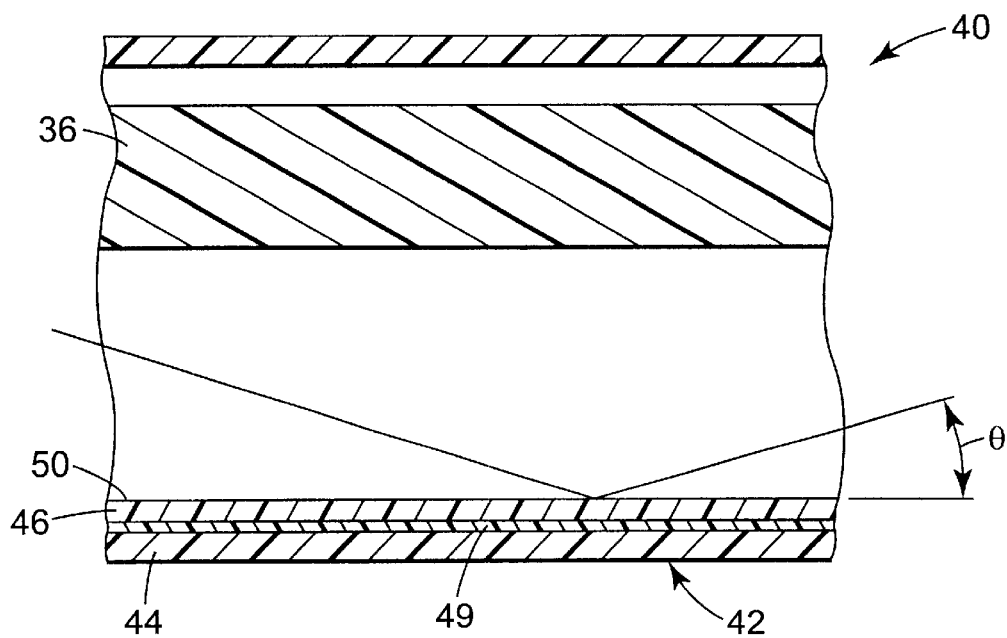
FIG. 3 is a cross-sectional side view of the light guide of FIG. 2.

FIGS. 2 and 3 illustrate an illumination device 40 constructed in accordance with the principles of the present invention. The illumination device 40 includes a hollow, tubular light guide 42 surrounded by a flexible or rigid, protective outer sleeve 44. The light guide 42 includes a cylindrical wall 46 having a structured outer surface 48 and a generally smooth inner surface 50. The structured outer surface 48 includes a linear array of prisms 52 (e.g., right angle isosceles prisms or other types of prisms) arranged side-by-side in parallel relationship to form a plurality of grooves 54 running the length of the light guide 42.

For indirect lighting applications, a back reflector 49 may optionally be included to direct light upward. For direct lighting applications, a back reflector may be positioned at the top to direct light downward from the fixture. The back reflector may be a semi-transparent, translucent or light-blocking material.

The light guide 42 is configured such that incident light traveling through the light guide 42, within a predetermined angular range, will be totally internally reflected within the light guide 42. For example, as shown in FIG. 3, light that strikes the inner surface 50 of the light guide 42 at an angle less than θ will be totally internally reflected within the light guide 42. The angle θ is defined as the arc sine of the ratio of the index of refraction of the surrounding medium (typically air) to that of the wall material. If the refractive index of the dielectric material is 1.5, as is the case for acrylic plastic, then θ is about 27.5 degrees.

The illumination device 40 also preferably includes one or more diffusely reflective extractors 36 capable of reflecting or refracting light to an angle greater than θ to cause the light to be transmitted or released through the cylindrical wall 46 of the light guide 42. As shown in FIGS. 2–3, the extractor 36 extends substantially distally away from the inner surface 50 of the cylindrical wall 46 toward the interior of the light guide 42 so that it does not substantially contact the inner surface 50. Minimizing the surface area of contact between the extractor 36 and the inner surface 50 minimizes or eliminates shadows in the transmitted light. The present extractor 36 may be used for direct or indirect lighting applications.

As shown in FIG. 2, the extractor 36 is generally rectangular. However, it will be appreciated that the extractor 36 can have any number of different shapes. Exemplary other types of shapes include diamonds, octagons, triangles, rectangles, crosses, ellipses, non-symmetrical shapes, etc. The extractor 36 is preferably attachable to the light guide 42 using a variety of techniques, such as adhesives, fasteners, mechanical interlocking or interference fits such as channels or bayonet connectors, and the like. Consequently, a plurality of identical or nearly identical light guides 42 can be manufactured and adapted to a particular application by attaching an appropriate extractor 36, either at the factory or at the installation site.

The extractor 36 may be constructed from a material having the desired light scattering properties, such as SCOTCH-CAL EXTRACTOR FILM™ available from Minnesota Mining and Manufacturing Company. The extractor 36 may also be a transparent material, with minimal light scattering properties, or a translucent or non-transparent material having one or more diffusely reflective treated surfaces 38 that scatter light. The term "treated surface" refers to a diffusely reflective surface that scatters light. Depending upon the amount of light desired to be extracted from the light guide 42, the treated surface 38 of the extractor 36 can be varied. By increasing the light scattering properties and/or surface area of the treated surface 38 and/or the extractor 36, more light is extracted from the light guide 42. By decreasing the light scattering properties and/or surface area, less light is extracted from the light guide 42.

Modifying the light scattering properties of the extractor 36 can be accomplished by a variety of techniques. In one embodiment, the treated surfaces 38 are formed directly on the extractor 36. The treated surface 38 may comprise removing material from the extractor 36, such as by abrasion, sand blasting, mechanical deformation, chemical etching, and the like. Alternatively, the treated surface 38 may be prepared by applying, spraying, depositing, and/or printing diffusely reflective material or particles directly on the extractor 36. For example, elements or patterns can be printed (e.g., laser printed, ink jet printed, digitally printed, silk screen printed, etc.) directly on the extractor 36 (see FIGS. 4 and 5). Thermal transfer printers and thermal ink jet printers could also be used. The treated surfaces 38 can also be formed by a combination of removing and adding material.

In another embodiment, the treated surface 38 may comprise a continuous or discontinuous film, web or applique (referred to collectively as a "film") applied to the extractor 36. The film may contain diffusely reflective properties prior to application to the extractor 36. Alternatively, the film can be treated to provide the diffusely reflective properties after the film is applied to the extractor 36. In one embodiment, the film includes diffusely reflective properties on one surface and a pressure sensitive adhesive on the other surface. Any of the techniques discussed above may be used for generating the diffusely reflective properties on the film.

For some applications it is desired to make the brightness of the light substantially constant along the length of the light guide 42. The brightness of the released light at a particular point along the length of the light guide 42 is a function of the intensity of the light in the light guide 42 at that point. Since light is released as the light travels through the light guide 42, the intensity of the light decreases along the length of the light guide 42. By increasing the light scattering properties along the length of the light guide 42 in concert with the decrease in light intensity, it is possible to maintain a constant brightness along the light guide length. The principles of the present invention also encompass non-uniform or irregular brightness along the length of the light guide. For example, the present extractor 36 can be adapted to provide greater light intensity at various intervals along the length of the light conduit 42.

The particular material used for the wall 46 of the light guide 42 may vary, but for most applications it is preferred for the material to be generally flexible and transparent. Exemplary types of material include polymeric materials or glass. Useful polymeric materials include acrylics and polycarbonates having nominal indices of refraction of 1.49 and 1.58, respectively. Other useful polymers are polypropylenes, polyurethanes, polystyrenes, polyvinyl chlorides, and the like. The particular material selected is not significant to the invention hereof, so long as it provides the described function. One exemplary type of product suitable for use in making the cylindrical wall 46 is optical lighting film (OLF) available from the 3M Corporation, St. Paul, Minn.

There are a number of different ways to mass-produce the cylindrical wall 46 of the light guide 42. For example, U.S. Pat. Nos. 3,689,346; 4,244,683; and 4,576,850, all disclose techniques suitable for manufacturing the cylindrical wall 46. The particular manufacturing process is not essential to the present invention, and is a matter of choice based on economics and availability.

Figure 10:
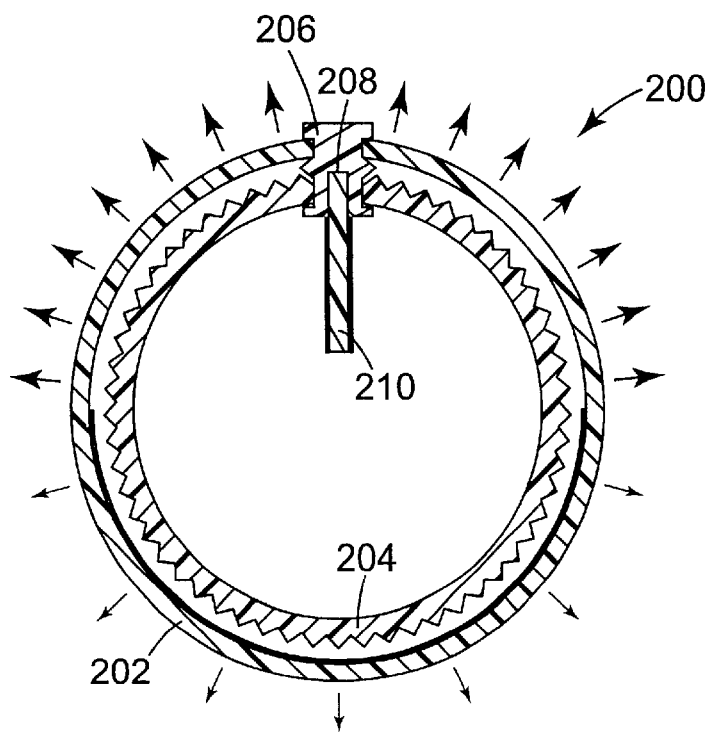
FIG. 10 is an end-sectional view of an alternate light guide with an extractor in accordance with the principles of the present invention.

To manufacture the light guide 42 using OLF, the OLF is preferably rolled or curled into a tubular configuration with a longitudinal seam of the tube being secured by conventional techniques such as ultrasonic welding, adhesive, adhesive tape, clips, or an extrusion (see FIG. 10). In some embodiments, the longitudinal edges of the tube can be overlapped. In other embodiments, the cylindrical wall 46 can be held in the tubular configuration via contact with the protective sleeve 44. While it is convenient for the light conduit 42 to be made from flexible OLF, other structures could also be used. For example, the light guide 42 can be extruded or molded to provide either a flexible or rigid unitary member.

The thickness of the cylindrical wall 46 of the light guide 42 is not particularly essential to the present invention. However, in one non-limiting embodiment, the cylindrical wall 46 has a nominal thickness of about 0.015 of an inch and includes about 70 prisms per inch. Such an embodiment exhibits sufficient flexibility to be capable of being curled into a cylindrical light guide having a minimum diameter of approximately three inches. In addition, such a film will be rigid and self-supporting enough to maintain its shape when curled into a cylindrical light guide having a diameter of at least 18 inches.

Figure 4:
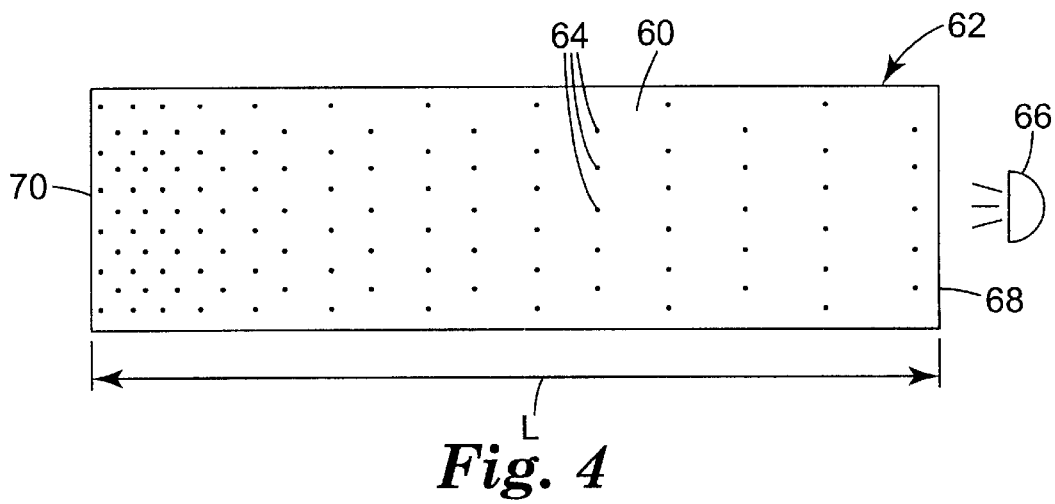
FIG. 4 is a top plan view of an extractor in accordance with the principles of the present invention.

FIG. 4 illustrates one possible treated surface 60 for an extractor 62 that can be used with the light guide 42 in accordance with the present invention. The treated surface 60 comprises a pattern of elements 64. As used herein, "elements" refers to dots or structures of any shape or size that operate to scatter light. The elements can be essentially two-dimensional or three-dimensional. The particular pattern of FIG. 4 is adapted to provide uniform brightness along the length of the light guide 42 when used with a single light source 66. The extractor 62 has a first end 68 near the light source 66 and a second end 70. The element 64 concentration gradually increases along a gradient extending along the length L from the first end 68 to the second end 70. Uniform light brightness is provided by increasing the element concentration along the length L in proportion to the decrease in light intensity within the light guide 42.

Figure 5:
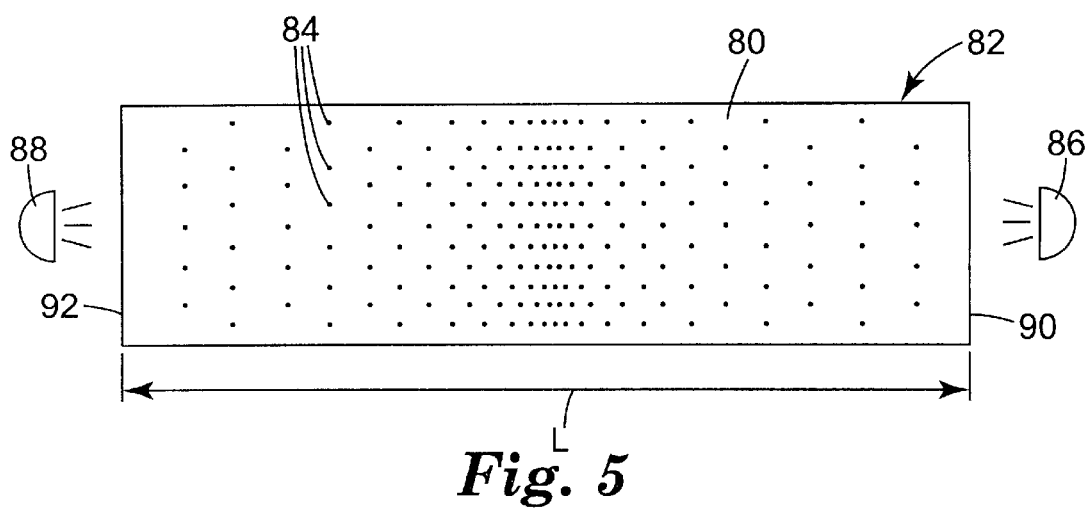
FIG. 5 is a top plan view of an alternate extractor in accordance with the principles of the present invention.

FIG. 5 shows another treated surface 80 for an extractor 82 in accordance with the principles of the present invention. The pattern of elements 84 has a concentration gradient that extends along the length L of the extractor 82. The gradient is adapted for providing a uniform brightness along the length L of the light guide 42 when light sources 86, 88 are positioned at each of the ends 90, 92. To provide uniform brightness, the element concentration gradually or progressively increases from the ends 90, 92 toward the middle of the length L. Thus, the largest concentration of elements 84 is located at the middle of the extractor 82.

The element concentration on the extractors 62, 82 can be varied by numerous different techniques. For example, the element concentration can be increased by maintaining a constant number of elements per unit area, and increasing the relative size of the elements. Alternatively, the element concentration can be increased by maintaining a uniform element size, and increasing the number of elements per unit area. Still further, both the size or thickness of the elements and the number of elements per unit area can be concurrently varied to achieve desired lighting appearances.

In one embodiment, the elements are made of a translucent material capable of both reflecting and refracting (i.e., transmitting) light. The elements can be made of any number of different types of reflective/refractive coatings, inks, dyes or paints. A diffusely reflective white material such as titanium dioxide is preferred. The elements are preferably sufficiently thin to ensure a certain degree of translucency. For example, when titanium dioxide is used, the elements preferably have a thickness in the range of 10–15 microns. The combination of reflected and refracted light that escapes from the light guide 42 assists in providing a more uniform lighting. Various techniques for modifying the light scattering properties of an extractor are disclosed in U.S. patent application Ser. No. _____, entitled Illumination Device, filed Mar. 16, 2000.

Figure 6:
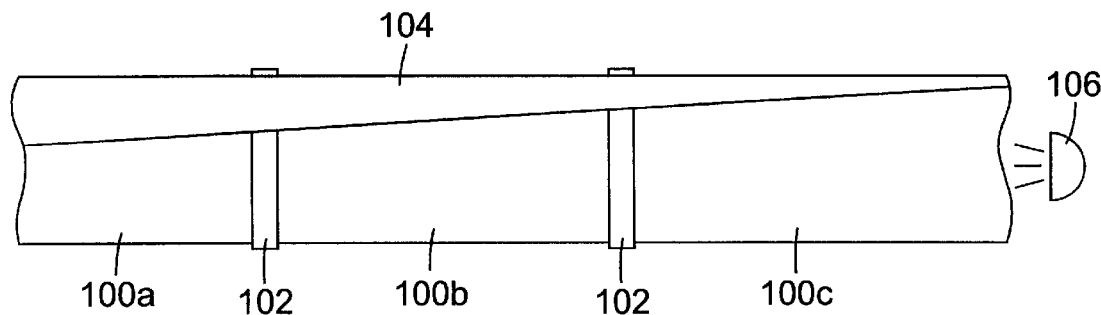
FIG. 6 is a top plan view of an extractor with non-uniform surface area accordance with the principles of the present invention.

In addition to modifying the light scattering properties of the treated surface, the surface area of the extractor can also be modified. FIG. 6 is a side sectional view of multiple sections of a light guide 100a, 100b, 100c (referred to collectively as "100") connected using collars 102. Collars, such as disclosed in U.S. patent application Ser. No. 09/248,807, entitled COUPLING SYSTEM FOR A LIGHT CONDUIT, filed Feb. 12, 1999 are suitable for this purpose.

An extractor 104 of non-uniform surface area extends distally into the light guides 100. The progressively increasing surface area of the extractor 104 increases the light scattering properties distally away from light source 106. The present extractor of non-uniform surface area may be used alone, or in combination with the various treated surfaces disclosed herein.

Figure 7:
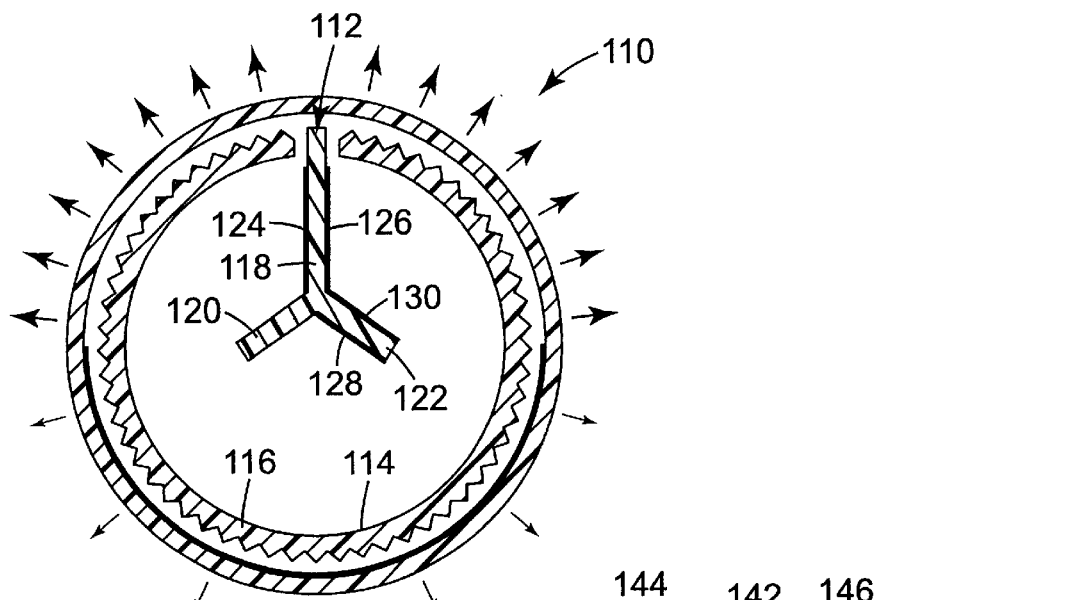
FIG. 7 is an end-sectional view of an alternate light guide having an extractor with multiple surfaces in accordance with the principles of the present invention.

FIG. 7 is cross sectional view of an illumination device 110 in accordance with the principles of the present invention. Extractor 112 extends distally from inner surface 114 of optical lighting film 116. The extractor 112 comprises multiple segments 118, 120, 122. Segment 118 includes treated surfaces 124, 126. Segment 122 includes treated surfaces 128, 130. Segment 120, however, does not include any treated surfaces. In an embodiment where the segment 120 is constructed of a transparent material, minimal light scattering will occur in this region. The multi-segmented structure of the extractor 112 provides significantly greater surface area than the extractor 36 illustrated in FIG. 2, thereby permitting the light scattering properties to be progressively increased over a very long section of light guide. Alternatively, the light scattering properties can be dramatically increased along a specific section of the illumination device 110. In one embodiment, it is contemplated that the segments 118, 120, 122 are each constructed of a transparent material so that minimal light scattering occurs until the appropriate treated surfaces are provided.

Figure 8:
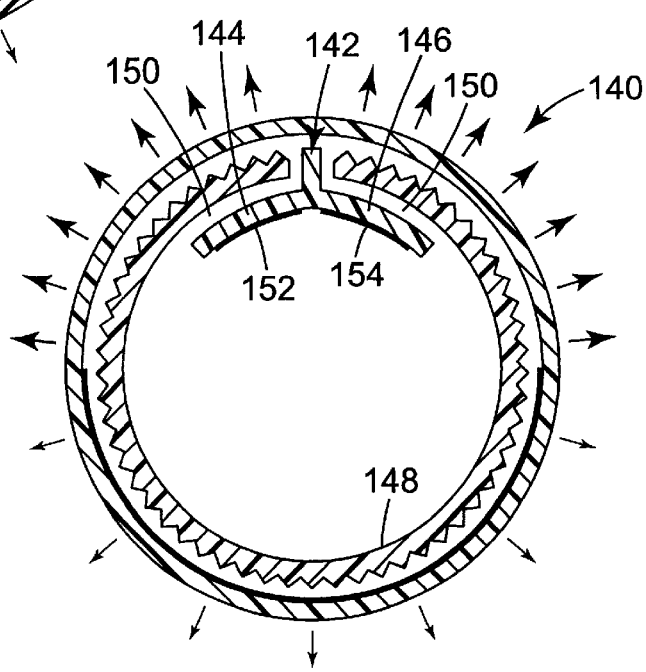
FIG. 8 is an end-sectional view of an alternate light guide having an extractor with contoured surface in accordance with the principles of the present invention.

FIG. 8 is a sectional view of an alternate illumination device 140 in which the extractor 142 comprises two segments 144, 146 that extend distally from inner surface 148. Treated surfaces 152, 154 may have the same or different surface areas. Similarly, segments 144, 146 may have the same or different surface areas. In the embodiment illustrated in FIG. 8, the segments 144, 146 generally follow the contour of the inner surface 148, but are separated therefrom by a small gap 150.

Figure 9:
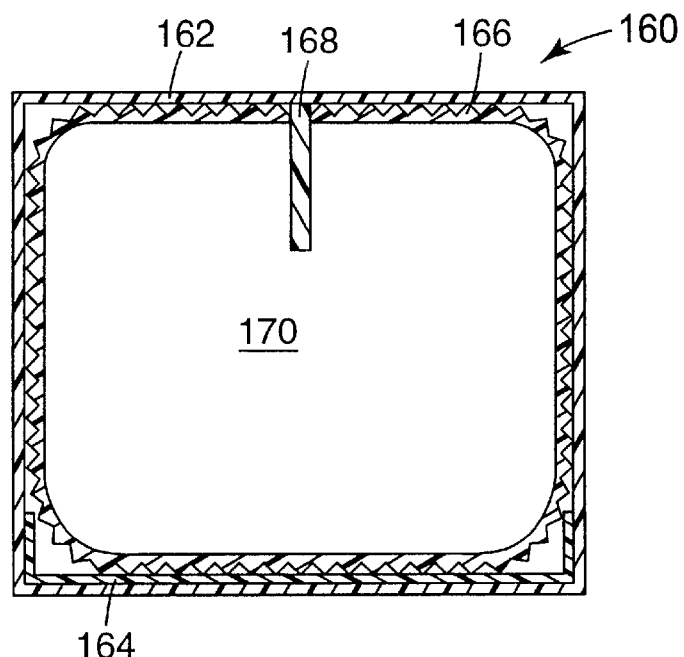
FIG. 9 is an end-sectional view of a non-circular light guide with an extractor in accordance with the principles of the present invention.

FIG. 9 illustrates an alternate illumination device 160 in accordance with the principles of the present invention. Protective shell 162 is rectangular or square. Back reflector 164 optionally extends along a bottom portion of the outer shell. The optical lighting film 166 is arranged in a curvilinear shape and includes an extractor 168 extending distally in towards the interior 170.

FIG. 10 is a cross sectional view of an alternate illumination device 200 in which the protective outer sleeve 202 and optical lighting film 204 are joined along a common edge by an extrusion 206. The extrusion 206 includes an interface 208 to which the extractor 210 is permanently attached or releasably engaged. The interface 208 can be a simple slot, a key way, a complex shape, a receptor to receive a bayonet type connector, or simply a flat surface to which the extractor 210 is adhered. Multiple, identical sections of the illumination device 200 can be assembled and stored as inventory. An extractor 210 designed for the particular installation site can be engaged with the interface 208 either at the manufacturing facility or the installation site. In another embodiment, a plurality of substantially identical illumination devices 200 are assembled at the installation site. A customized extractor 210 is then engaged with the interface 208 of the plurality of previously joined illumination devices 200. The present distally extending extractor 210 can be subsequently removed for repair or to alter the light distribution from the illumination device 200.

Figure 11:
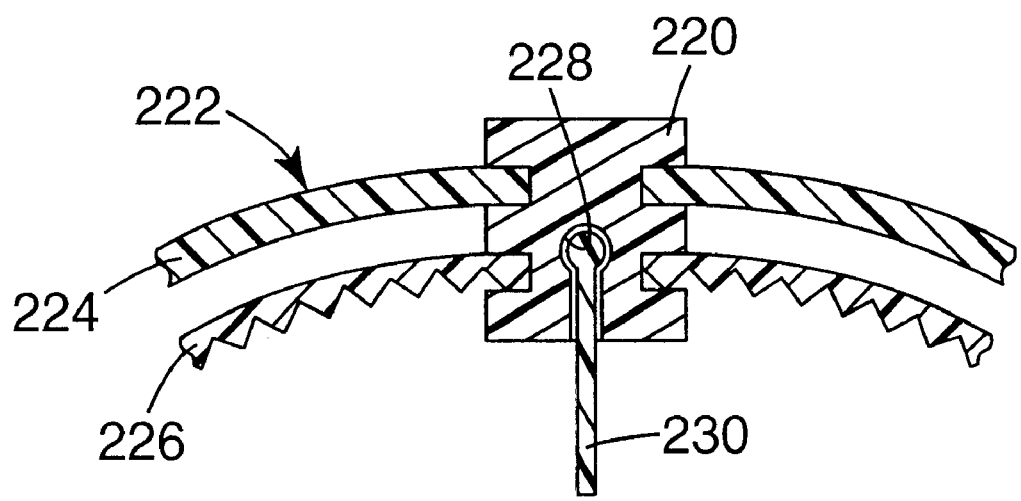
FIG. 11 is a cross sectional view of an alternate extrusion for an illumination device adapted to retain a protective outer sleeve and optical lighting film along a common edge.

FIG. 11 is a cross sectional view of an alternate extrusion 220 for an illumination device 222 adapted to retain a protective outer sleeve 224 and optical lighting film 226 along a common edge. The extrusion 220 includes a key way interface 228 to which a distally extending extractor 230 is slidingly attached. The extractor 230 can be slide into a single section of the illumination device 222 or multiple section, either at the manufacturing facility or the installation site. The ease of installation and removal of the extractor 230 permits the illumination device 222 to be easily repaired or adapted to other applications. For example, the light intensity emitted along a given section of the illumination device 222 can be increased or decreased by removing the existing extractor 230 and sliding in a different extractor 230 with different light scattering properties.

Figure 12:
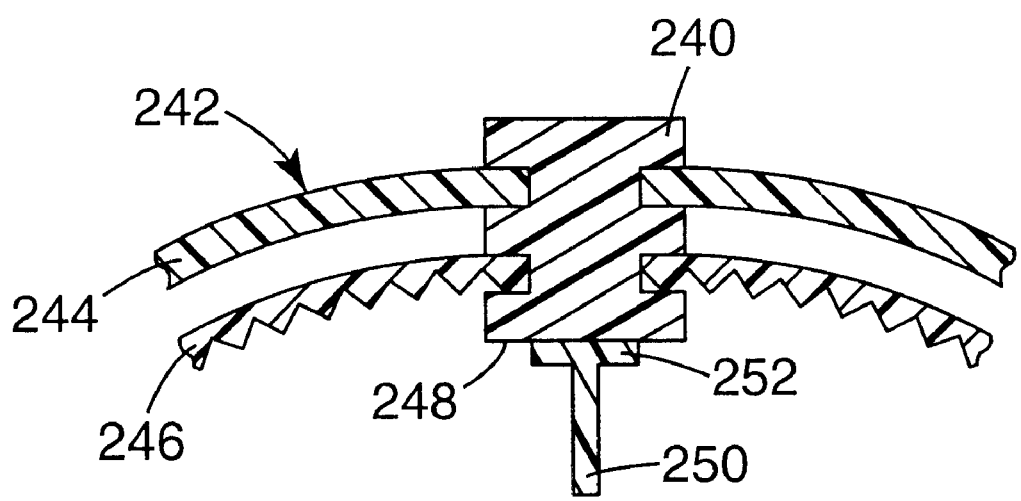
FIG. 12 is a cross sectional view of an alternate extrusion for an illumination device adapted to retain a protective outer sleeve and optical lighting film along a common edge.

FIG. 12 is a cross sectional view of an alternate extrusion 240 for an illumination device 242 adapted to retain a protective outer sleeve 244 and optical lighting film 246 along a common edge. The extrusion 240 includes a flat interface 248 to which a distally extending extractor 250 is attached using a variety of techniques, such as adhesives, fasteners, magnetic strips and the like. In the illustrated embodiment, the extractor 250 is a "T" shape with a large portion 252 adapted to attach to the flat interface 248. It is not required that the interface 248 is flat. Rather, it can be any of a variety of shapes that permit the extractor 250 to be aligned and attached to the extrusion 240. The extractor 250 can be attached to a single section of the illumination device 222 or multiple section, either at the manufacturing facility or the installation site.

All of the patents and patent applications disclosed herein, including those set forth in the Background of the Invention, are hereby incorporated by reference. With regard to the foregoing description, it is to be understood that changes may be made in detail, especially in matters of the construction materials employed and the shape, size and arrangement of the parts without departing from the scope of the present invention. It is intended that the specification and depicted aspects be considered exemplary only, with a true scope and spirit of the invention being indicated by the broad meaning of the following claims.

What is claimed is:

1. An illumination device comprising:
   a hollow light guide including a wall having an inner surface and a structured outer side, the structured outer side including a plurality of prisms defining grooves that extend along a length of the light guide; and
   an extractor having a major surface oriented generally parallel to and extending along at least a portion of the length of the light guide, the extractor projecting distally from the inner surface towards an interior of the light guide, the extractor being operative to cause light to be released through the wall of the light guide.

2. The illumination device of claim 1 wherein the extractor comprises at least one treated surface operative to cause light to be released through the wall of the light guide.

3. The illumination device of claim 1 wherein the extractor comprises at least one treated surface comprising a diffusely reflective surface.

4. The illumination device of claim 1 wherein the extractor comprises at least one treated surface comprising material removed from at least a portion of a surface of the extractor.

5. The illumination device of claim 1 wherein the extractor comprises at least one treated surface comprising material added to at least a portion of a surface of the extractor.

6. The illumination device of claim 1 wherein the extractor comprises at least one treated surface comprising a printed pattern on at least a portion of the extractor.

7. The illumination device of claim 1 wherein the extractor comprises at least one treated surface comprising one of inks, dyes and paints.

8. The illumination device of claim 1 wherein the extractor comprises as least one treated surface comprising a progressively increasing quantity of light released through the wall of the light guide.

9. The illumination device of claim 1 the extractor comprises one or more treated surfaces comprising a translucent material.

10. The illumination device of claim 1 wherein the extractor comprises a transparent material with one or more treated surfaces.

11. The illumination device of claim 1 wherein the extractor generally follows a portion of a contour of the inner surface.

12. The illumination device of claim 1 wherein the extractor is releasably attached to the hollow light guide.

13. The illumination device of claim 1 wherein the light guide comprises a mounting surface to which the extractor is attached.

14. The illumination device of claim 1 wherein the extractor comprises a non-uniform surface area.

15. The illumination device of claim 1 wherein the extractor comprises a progressively increasing surface area.

16. The illumination device of claim 1 wherein the extractor comprises at least one treated surface comprising a film applied to at least a portion of the extractor.

17. The illumination device of claim 16, wherein the film comprises diffusely reflective properties on one surface and an adhesive on another surface.

18. The illumination device of claim 1 wherein the light guide comprises a back reflector.

19. The illumination device of claim 18 wherein the back reflector is located along a bottom surface of the light guide.

20. The illumination device of claim 18 wherein the back reflector comprises one of an opaque material or a translucent material.

21. The illumination device of claim 1 comprising an extrusion extending along the length of the light guide, the extrusion comprising an interface to which the extractor is attached.

22. The illumination device of claim 21 wherein the extractor is releasably attached to the extrusion.

23. The illumination device of claim 21 wherein the interface surface comprises a key way extending along a length of the extrusion.

24. The illumination device of claim 23 wherein the extractor comprises a geometry slidingly engagable with the key way.

25. A method of forming an illumination device comprising the steps of:
   providing a hollow light guide including a wall having an inner surface and a structured outer side, the structured outer side including a plurality of prisms defining grooves that extend along a length of the light guide; and
   attaching an extractor having a major surface oriented generally parallel to and extending along at least a portion of the length of the light guide, the extractor projecting distally from the inner surface towards an interior of the light guide, the extractor being operative to cause light to be released through the wall of the light guide.

26. The method of claim 25 comprising treating at least one surface of the extractor to cause light to be released through the wall of the light guide.

27. The method of claim 25 comprising treating at least one surface of the extractor to be a diffusely reflective surface.

28. The method of claim 25 comprising removing material from at least a portion of a surface of the extractor.

29. The method of claim 25 comprising adding material to at least a portion of a surface of the extractor.

30. The method of claim 25 comprising printing a pattern on at least a portion of the extractor.

31. The method of claim 25 comprising applying inks, dyes and paints to the extractor.

32. The method of claim 25 comprising treating the extractor to progressively increases the quantity of light released through the wall of the light guide.

33. The method of claim 25 wherein the extractor is arranged to generally follow a portion of a contour of the inner surface.

34. The method of claim 25 comprising releasably attaching the extractor to the light guide.

35. The method of claim 25 comprising providing the light guide with a mounting surface to which the extractor is attached.

36. The method of claim 25 comprising providing an extrusion extending along the length of the light guide, the extrusion comprising an interface to which the extractor is attached.

37. The method of claim 25 comprising providing an extractor with a non-uniform surface area.

38. The method of claim 25, wherein the extractor comprises a plurality of surfaces, the method comprising treating one or more of the surfaces.

39. The method of claim 25 comprising locating a back reflector in the light guide.

40. The method of claim 25 comprising locating a back reflector along a bottom surface of the light guide.

41. The method of claims 25 wherein the light guide comprises a plurality of substantially identical light guides.

42. The method of claim 25 comprising the step of attaching a plurality of hollow light guides together before attaching the extractor.

43. The method of claim 25 comprising the step of mounting a plurality of hollow light guides at an installation site before attaching the extractor.

44. The method of claim 25 comprising applying a film to at least a portion of the extractor.

45. The method of claim 44 comprising the step of treating the film with diffusely reflective properties on one surface and applying an adhesive to the other surface.

* * * * *